(12) United States Patent
Yu (10) Patent No.: US 8,065,292 B2
(45) Date of Patent: Nov. 22, 2011

(54) GENERATING AN INDEX FOR A NETWORK SEARCH ENGINE

(75) Inventor: Gilbert Yu, Cupertino, CA (US)

(73) Assignee: Cisco Technology, Inc., San Jose, CA (US)

(*) Notice: Subject to any disclaimer, the term of this patent is extended or adjusted under 35 U.S.C. 154(b) by 254 days.

(21) Appl. No.: 11/379,044

(22) Filed: Apr. 17, 2006

(65) Prior Publication Data

US 2007/0244857 A1 Oct. 18, 2007

(51) Int. Cl.
*H04L 12/26* (2006.01)
*G06F 17/30* (2006.01)
*G06F 7/00* (2006.01)

(52) U.S. Cl. ......... 707/711; 370/230; 707/753; 707/769

(58) Field of Classification Search ............... 707/3, 753
See application file for complete search history.

(56) References Cited

U.S. PATENT DOCUMENTS

| 5,974,409 | A * | 10/1999 | Sanu et al. ................ 707/3 |
| 6,285,999 | B1 | 9/2001 | Page |
| 6,631,372 | B1 | 10/2003 | Graham |
| 6,748,385 | B1 * | 6/2004 | Rodkin et al. ............. 707/10 |
| 6,799,176 | B1 | 9/2004 | Page |
| 6,978,265 | B2 * | 12/2005 | Schumacher ............... 707/4 |
| 7,072,888 | B1 * | 7/2006 | Perkins .................... 707/5 |
| 7,133,365 | B2 * | 11/2006 | Klinker et al. ............ 370/238 |
| 7,398,271 | B1 * | 7/2008 | Borkovsky et al. ........ 707/7 |
| 7,594,011 | B2 * | 9/2009 | Chandra .................. 709/224 |
| 2002/0062223 | A1 * | 5/2002 | Waugh .................... 705/1 |
| 2003/0198190 | A1 * | 10/2003 | Rajan et al. .............. 370/252 |
| 2004/0073533 | A1 * | 4/2004 | Mynarski et al. ......... 707/1 |
| 2004/0249975 | A1 * | 12/2004 | Tuck et al. ............... 709/245 |
| 2006/0291388 | A1 * | 12/2006 | Amdahl et al. ........... 370/230 |
| 2007/0112730 | A1 * | 5/2007 | Gulli et al. ............... 707/3 |
| 2007/0214131 | A1 * | 9/2007 | Cucerzan et al. ......... 707/5 |
| 2007/0233857 | A1 * | 10/2007 | Cheng et al. ............. 709/224 |

OTHER PUBLICATIONS

Junghoo Cho, "Parallel Crawlers" May 7-11, 2002, ACM, p. 1-13.*
"Alexa.com home page [online].", [archived on Apr. 17, 2005]. Observed on the Internet: <http://web.archive.org/web/20050417022110/http://alexa.com/>, (2005), 3 pgs.

* cited by examiner

*Primary Examiner* — Pierre Vital
*Assistant Examiner* — Sabana Rahman
(74) *Attorney, Agent, or Firm* — Schwegman, Lundberg & Woessner, P.A.

(57) ABSTRACT

A method of generating a TrafficRank index for a network search engine is described. The method includes monitoring network traffic through a network device. The method further uses the monitored traffic information to generate and maintain a TrafficRank index. The invention extends to a method of generating search results, including generating search results from a search engine index and ranking the search results based on the TrafficRank index. The invention also extends to a method of generating and updating a search engine index either in real-time or in batch mode. If the method is adopted, any website or URLs accessed through website monitor/notifier/updater module by a web user, either by clicking on a hypertext link, entering the URL address on a web browser, or selecting a bookmark on a web browser, would be included and updated in the search engine index.

20 Claims, 10 Drawing Sheets

| | TRAFFIC RANK (THIS WEEK) | SITE OR URL | NUMBER OF HITS THIS WEEK (E.G., LAST 7 DAYS) | AVERAGE SESSION DURATION | ACCESSED BY | TRAFFIC RANK (LAST WEEK) | TRAFFIC RANK (E.G., 2 WEEKS AGO) | RELATIVE STRENGTH (E.G., 0-100) | 52 WEEK (HIGH-LOW) |
|---|---|---|---|---|---|---|---|---|---|
| 601.1 | | | | | | | | | |
| 601.2 | 1 | www.abc.com | 10000 | 50 seconds | IP ADDRESS #1 IP ADDRESS #2 IP ADDRESS #3 ... | 2 | 3 | 99 | 30000-200 |
| 601.3 | 5 | www.pgr.co.de | 5000 | 25 seconds | . . . | 3 | 1 | 70 | 21000-1000 |
| | ⋮ | ⋮ | ⋮ | ⋮ | ⋮ | ⋮ | ⋮ | ⋮ | ⋮ |
| 601.n | 15 | www.xyz.org | 2000 | 100 seconds | . . . | NEW ENTRY | NEW ENTRY | 80 | 5000-2000 |

| | 602 | 604 | 606 | 608 | 610 | 612 | 614 | 616 | 618 |
|---|---|---|---|---|---|---|---|---|---|
| | TRAFFIC RANK (THIS WEEK) | SITE OR URL | NUMBER OF HITS THIS WEEK (E.G., LAST 7 DAYS) | AVERAGE SESSION DURATION | ACCESSED BY | TRAFFIC RANK (LAST WEEK) | TRAFFIC RANK (E.G., 2 WEEKS AGO) | RELATIVE STRENGTH (E.G., 0-100) | 52 WEEK (HIGH-LOW) |
| 601.1 | 1 | www.abc.com | 10000 | 50 seconds | IP ADDRESS #1 IP ADDRESS #2 IP ADDRESS #3 | 2 | 3 | 99 | 30000-200 |
| 601.2 | 5 | www.pgr.co.de | 5000 | 25 seconds | ... | 3 | 1 | 70 | 21000-1000 |
| 601.3 | ... | ... | ... | ... | ... | ... | ... | ... | ... |
| 601.n | 15 | www.xyz.org | 2000 | 100 seconds | ... | NEW ENTRY | NEW ENTRY | 80 | 5000-2000 |

GENERATING AN INDEX FOR A NETWORK SEARCH ENGINE

FIELD

This application relates to network searching, and particularly to a method of and system for generating network search results. In an example embodiment, the method and system may apply to web (Internet) and enterprise (Intranet) searches.

BACKGROUND

Traditional search engines have three basic components: a crawler, an indexer, and a user interface. The crawler is a program which starts with a seed or source URL (Uniform Resource Locator), and scans a web page associated with the seed URL by traversing each of the links on the web page, and submitting each of the traversed links to the indexer. The crawler then scans each web page associated with the traversed URLs or links, to determine further links, and the process is thus repeated recursively. The process is repeated until it is stopped manually by a system administrator, it reaches a maximum pre-determined crawl time, or it has traversed all the URLs it could find. A shortcoming of the crawling process is that web pages which are not linked to by other web pages may easily be overlooked, and therefore not indexed. Also, the crawling process can take weeks or months.

The indexer is a program which scans words or other content of the traversed web pages to populate a massive database called an index. The user interface (also known as a search engine) is a program which presents an Internet user or searcher with an input medium to enter search criteria, for example keywords or media type. The search engine program checks the index against the search criteria to return a set of relevant search results. Typically, a list of search results pages (SRP) is returned, which includes all the web pages or documents matching the search criteria of the user.

First generation full-text search engines rank the search results based on a statistical analysis of word relationships of the matched document, i.e. based only on the content of the document itself. The statistical analysis is based on number of phrases in the document which match the search criteria, size of the document, proximity and location of the matching search criteria to one another, etc. Examples of first generation search engines are AltaVista, and Excite.

Second generation full-text search engines, for example Google, look beyond the matching document to determine the rank or the search results. Google uses PageRank, which determines how many external web pages link to the matching document. The theory behind PageRank is that more important or relevant documents are referred to or linked to more often by highly PageRanked or important external web pages. A shortcoming of PageRank is that the links in the external web pages could be outdated or obsolete, and the external links do not reflect current popularity of the document.

BRIEF DESCRIPTION OF DRAWINGS

The present invention is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of embodiments of the present invention. It will be evident, however, to one skilled in the art that the present invention may be practiced without these specific details.

In an example embodiment, two components may be added to a typical search engine, namely a TrafficRank algorithm and a website monitor/notifier/updater. In the TrafficRank algorithm or ranking of the search results may be based on number of hits/accesses it gets from web users, among other traditional factors. This popularity based ranking system may be more real-time and more relevant than PageRank since it is user based, not web author based. The traffic monitor and search engine notifier/updater may provide a method that monitors appearance of new sites and/or URLs and notifies a search engine to add such new sites to its indexes or add it to the index directly itself. The traffic monitor and index updater may also notify a search engine to update its index or update the index directly itself when a newer version of a document is discovered or a document is no longer available.

Figure 1A:
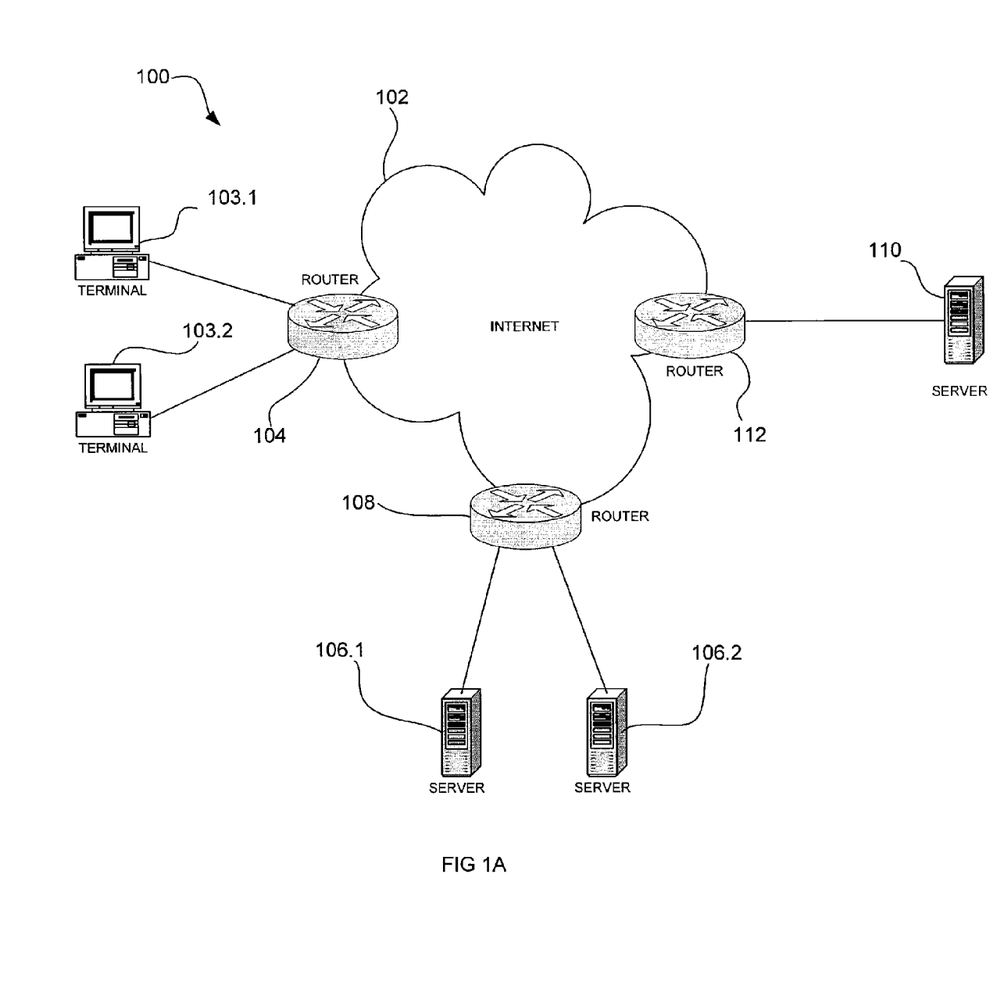
FIG. 1A shows a schematic representation of a network topology used in an example embodiment.

In FIG. 1A of the drawings, an electronic data communications network is generally indicated by reference numeral 100. In this example embodiment, the network 100 forms part of the Internet 102. Everything about the Internet 102 could very well apply to an enterprise network or an Intranet. Routers 104, 108, 112 may form part of the Internet 102 or may be separate from the Internet 102. In other embodiments, one or more of the routers 104, 108, 112 may be replaced with any Internet device capable of sending and receiving IP (Internet Protocol) packets, for example, a switch, computer server, or the like. Thus, it is to be understood that the routers 104, 108, 112 are merely representative of any network device(s) capable of forwarding network traffic such as packets. Computer terminals 103.1, 103.2 are connected to the Internet 102 via router 104. Users may use the computer terminals 103.1, 103.2 to access or surf the Internet 102, particularly to perform Internet searches. The computer terminals 103.1, 103.2 may instead be any other device capable of accessing the Internet 102, for example a laptop computer, a mobile telephone, a PDA (Personal Digital Assistant), or the like. Also, although only two computer terminals 103.1, 103.2 are shown by way of example, it is to be understood that the network 100 may include many more computer terminals, connected to the Internet 102 via router 104 or other routers (not shown).

The network 100 further includes computers servers 106.1, 106.2, which host Internet sites or websites, and which are connected to the Internet 102 via router 108. Also, although only two computer servers 106.1, 106.2 are shown, it is to be understood that the network 100 may include many more computer servers, connected to the Internet 102 via a router 108 or other routers (not shown). The computer servers 106.1, 106.2 are typically accessible from the computer terminals 103.1, 103.2 by Internet users by entering a URL or IP address associated with the computer servers 106.1, 106.2 into a web browser. Again, computers 103.1, 103.2, 106.1, 106.2 are shown separately from the Internet 102 for illustrative purposes only.

A computer which hosts a search engine 110, in accordance with an example embodiment, is connected to the Internet via a router 112. Conventionally, an Internet user wishes to search the Internet 102 for information, and knows the URL (for example, www.SearchEngineDomain.com) of the search engine 110. The user accesses the search engine 110 from computer terminal 103.1. IP packers sent from the computer terminal 103.1 arrive at the search engine 110 via routers 104, 112, and typically a plurality of intermediate routers (not shown) forming part of the Internet backbone. Individual IP packets do not necessarily follow the same path of routers, and may follow completely different paths. IP packets are then sent from the search engine 110, via routers 112, 104 and intermediate routers, to computer terminal 103.1, to present the user with a web page in the form of a user interface. The user enters search criteria via the user interface, and the search engine 110 presents the user with a search results page which includes a plurality of hyperlinks (typically in the form of URLs) of potentially relevant websites, for example a website hosted by the computer server 106.1. The user may follow the link to the computer server 106.1, in which case IP packets are transmitted via the routers 104, 108, and intermediate routers.

Figure 1B:
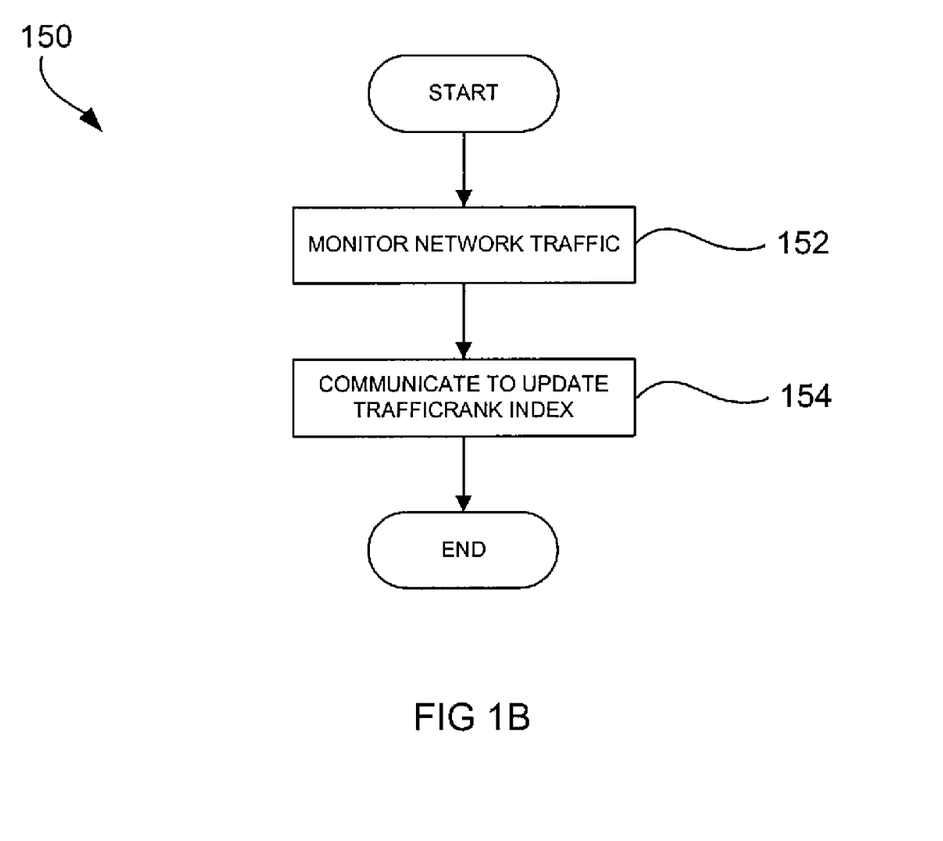
FIG. 1B shows a broad flow diagram of a method, in accordance with an example embodiment, of generating an index for a search engine.

As described in more detail below, in accordance with example embodiments, methods and systems to provide search results are described. For example, as shown in FIG. 1B, a method 150 may be invoked and, as shown at block 152, network traffic through a network device (e.g., the routers 104, 108, and 122) may be monitored to provide monitored traffic data or TrafficRank index. (see block 154). The TrafficRank index may optionally be combined with other algorithmic weightings (e.g., statistical analysis or word relationships in matching documents, number of web pages linked to a website, or the like).

Figure 2:
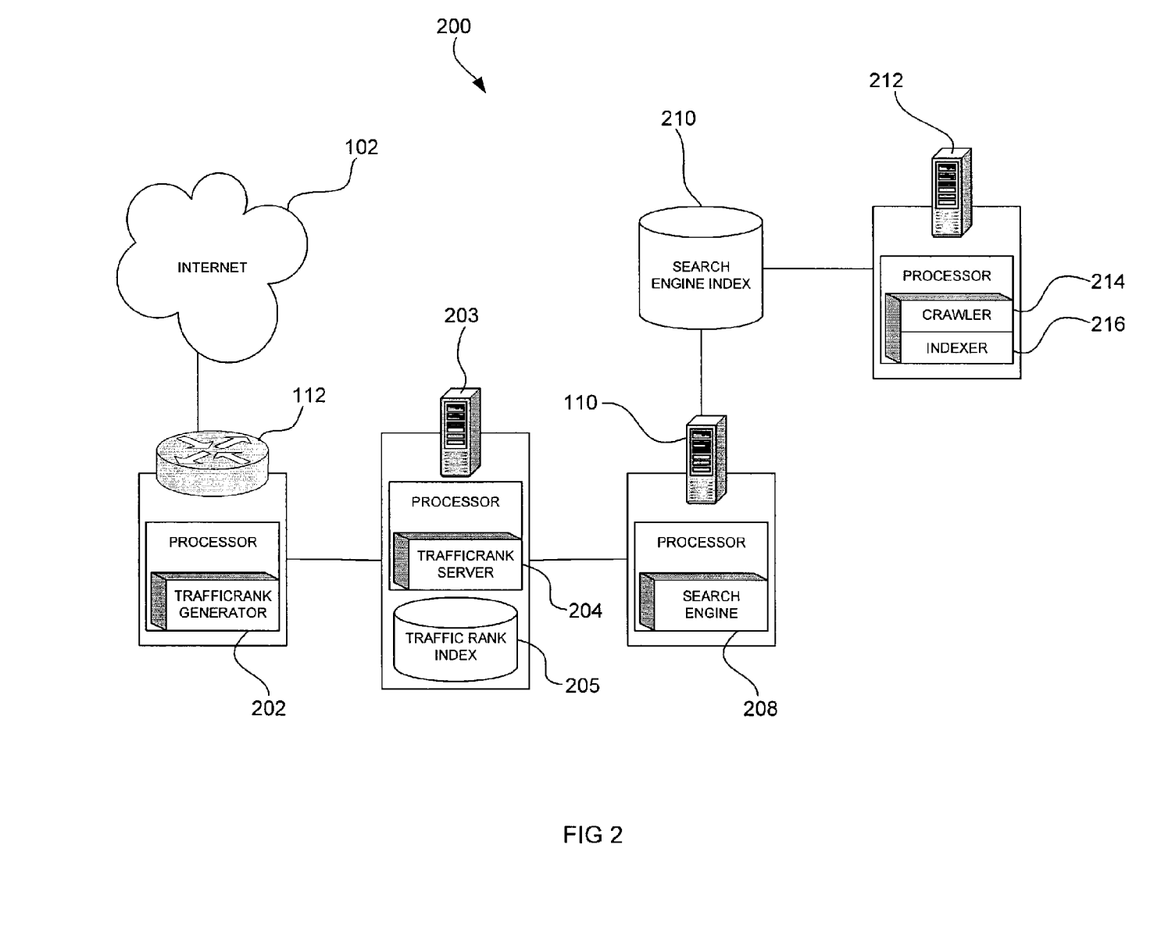
FIG. 2 shows a schematic representation of a first example embodiment of a system for generating TrafficRank.

Referring now to FIG. 2, a system 200, in accordance with a first example embodiment, is shown. In this example embodiment, a plurality of networked devices perform various search engine related functions, and individual functions are therefore distributed. The router 112 includes an AON (Application Orientated Network) module or "bladelet" (a set of operations) embedded therein. Although this example is described with reference to router 112, it is to be appreciated that any network device (for example routers 104, 108, and/or routers forming part of an Internet backbone) in the system 100 may operate similarly. The processor of the router 112 includes a conceptual module (which corresponds to a task performed by the processor) in the form of a TrafficRank generator 202. The TrafficRank generator 202 monitors or examines the IP packets which pass through the router 112 to count the number of times a destination URL or destination IP address is accessed. The TrafficRank generator 202 may therefore act as a network traffic monitor to determine how many hits a URL or a website receives. The TrafficRank generator may be configured to monitor hits to individual URLs of a website or aggregate hits on a website/domain.

However, it is to be appreciated that during a single session, a multitude of IP packets are typically communicated between computers, and the router 112 therefore may include pre-defined determination criteria to eliminate duplication thereby providing a more accurate determination of the number of hits a website receives. For example, multiple IP packets sent to a destination IP address from a single source IP address within a pre-determined time period (for example 1 hour) may be counted as only one hit. Instead, a single session may be counted as one hit, for example by determining the number of IP packets required to initiate a session or connection, and counting each initialisation packet (or the like) as only one hit. Instead, or in addition, the TrafficRank generator 202 may monitor how long a particular session lasts, with longer sessions indicating more popular or relevant websites. The TrafficRank generator 202 therefore creates traffic statistics (e.g., based on packet or datagram flow). The TrafficRank generator 202 may therefore operate at network level.

In the example embodiment, the monitored traffic data or statistics are communicated from the TrafficRank generator 202 via a connection arrangement, for example a network connection, to a computer server 203 which hosts a TrafficRank server 204. The TrafficRank server 204 stores the TrafficRank data, for example, in a database 205. In an example embodiment, the TrafficRank server 204 may provide a Traffic Rank Index 205 to search engines. For example, each website in the traffic index 205 may have an associated TrafficRank ranking. A website accessed more frequently may have a higher TrafficRank ranking than a website accessed less frequently.

Because the TrafficRank server 204 may receive traffic statistics from a plurality of routers, the TrafficRank server 204 may be configured to filter out duplicate hits for a single website. For example, if the TrafficRank server 204 receives traffic statistics from a plurality of routers each indicating that a particular website was accessed by a single source during a pre-defined time (for example one hour), it is likely that IP packets were all for one session but followed different paths (and therefore were routed between different routers), and the TrafficRank server 204 may count only one hit for that website. The TrafficRank server 204 may further include ranking rules to rank search results. The TrafficRank server 204 may, in addition or instead, filter out or process the monitored traffic data based on a source from which the traffic was received (e.g., a source address of a requesting computer terminal).

The system 200 further includes a search engine 208 hosted by the computer server 110, a search engine index 210, a crawler 214 and an indexer 216 hosted by computer server 212. The crawler 214 may start with a seed or source URL (Uniform Resource Locator), and scans a web page associated with the seed URL by traversing each of the links on the web page, and submitting each of the traversed links to the indexer. The crawler 214 then scans each web page associated with the traversed URLs or links, to determine further links, and the process is thus repeated recursively. The process is repeated until it is stopped manually by a system administrator, it reaches a maximum pre-determined crawl time, or it has traversed all the URLs it could find.

The indexer 216 may scan words or other content of the traversed web pages to populate a database which is called the search engine index. The search engine index 210 comprises a plurality of web addresses and contents of their associated web pages and, in an example embodiment, the search engine index 210 does not include TrafficRank data of the Internet 102.

Figure 3:
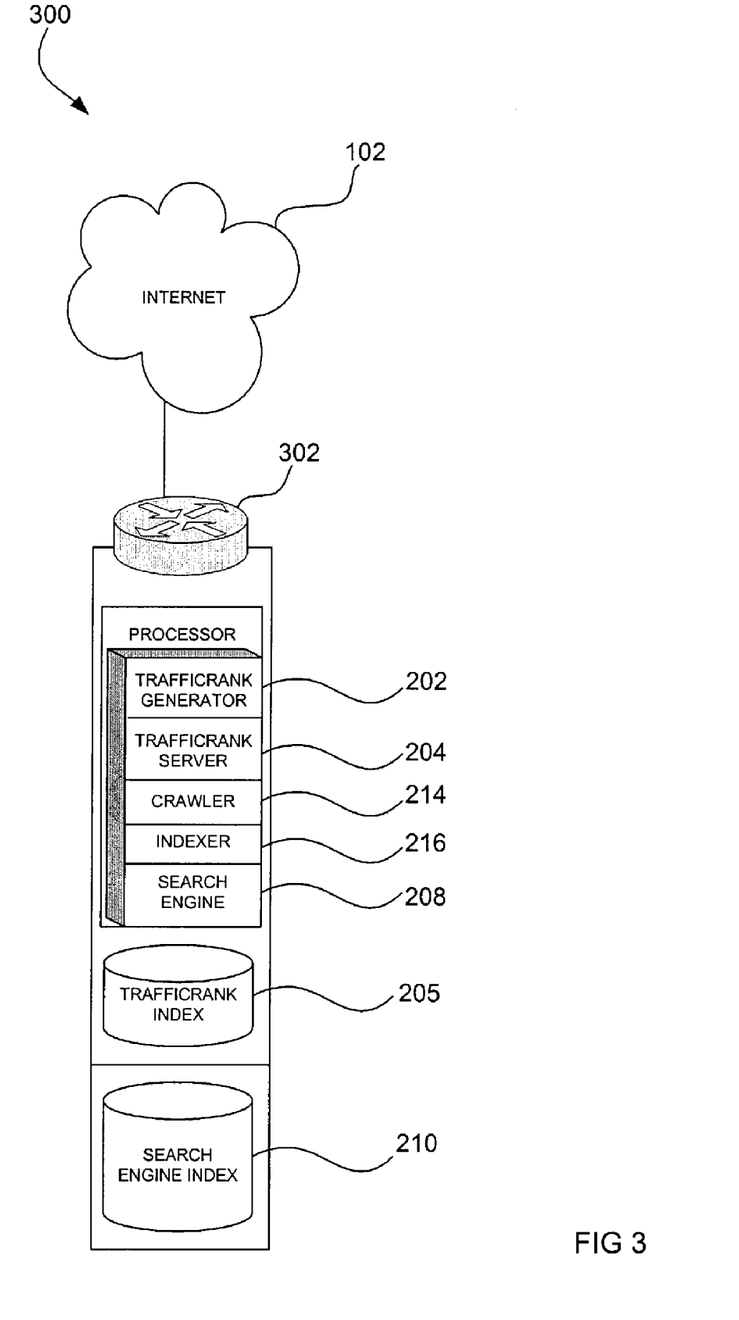
FIG. 3 shows a schematic representation of a second example embodiment of a system for generating TrafficRank in a bundled configuration.

Referring now to FIG. 3, a system 300, in accordance with a second example embodiment, is shown. This example embodiment is similar to that of FIG. 2, however many of the tasks have been consolidated into a network device shown by way of example as a router 302. The router 302 includes a plurality of modules, namely a TrafficRank generator 202, a TrafficRank server 204, a crawler 214, an indexer 216, and a search engine 208. Alternatively, all the components may also be separately housed in a web appliance, sitting behind the router 302. When a user using a web browser accesses the search engine 208 to perform an Internet search, website results from the search engine index 210 are ranked based, at least partially, on the amount of hits that each website in the search engine index 210 has received (e.g., websites which have received more hits or network traffic have a higher ranking).

Figure 4:
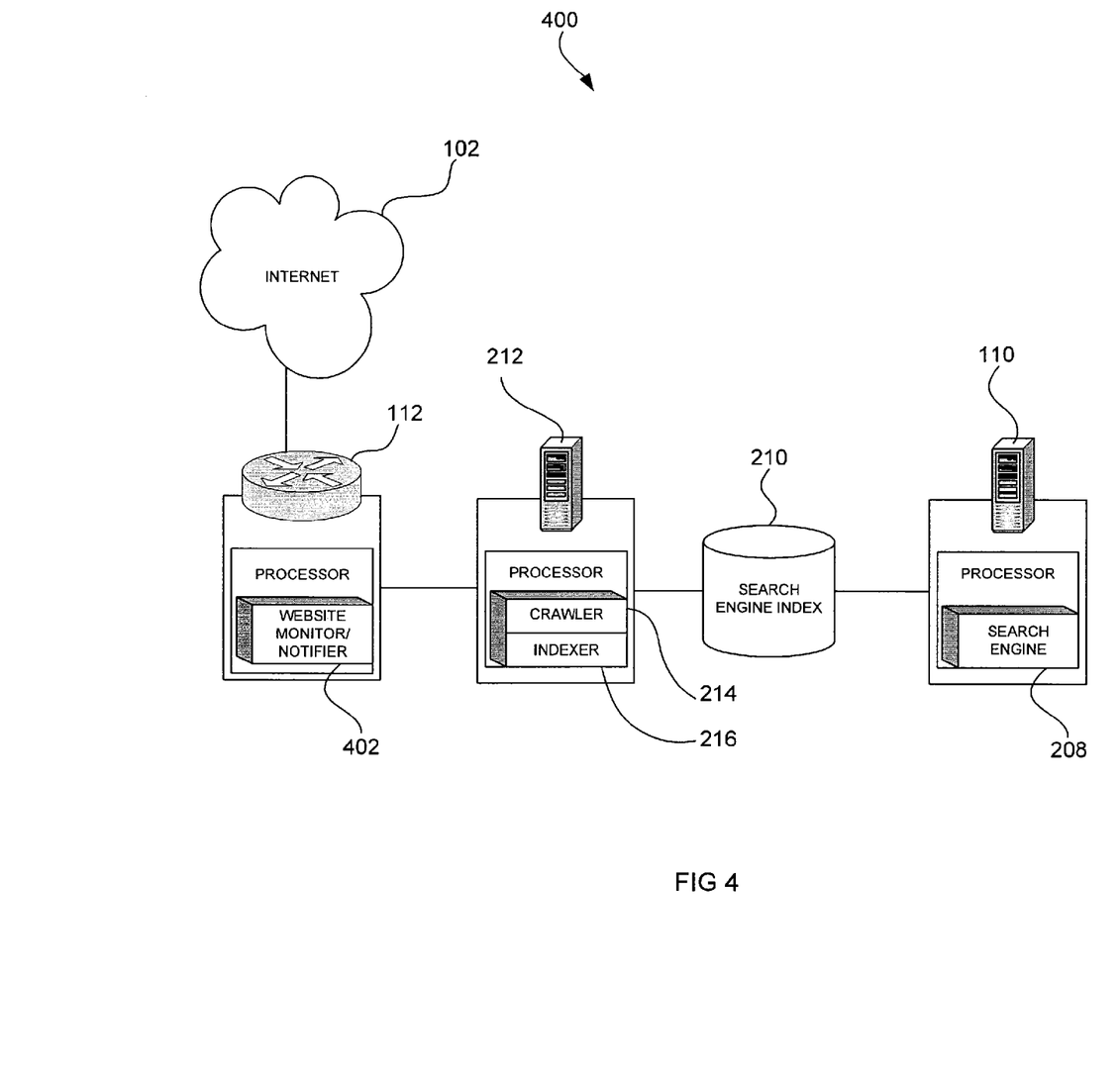
FIG. 4 shows a schematic representation of a third example embodiment of a system for updating a search engine index using website monitor/notifier.

Referring now to FIG. 4, a system 400, in accordance with a third example embodiment, is shown. In contrast with the systems 200, 300 of FIGS. 2 and 3, the system 400 is used for generating and updating the search engine index 210, in accordance with an example embodiment. The router 112 (or any network device) again includes, by way of example, an AON module or a "bladelet" embedded therein. The processor of the router 112 includes a website monitor/notifier module 402. The website monitor and notifier module 402 is operable to examine IP packets for URLs and/or IP addresses, and compare the URLs and/or IP addresses with the search engine index 210.

The website monitor and notifier module 402 will notify the indexer 216 about new sites/URLs. The website monitor and notifier module 402 may also notify the search engine indexer 216 in response to the index being out-of-date. Updating the search engine index 210 includes adding new websites and their associated addresses, amending existing websites, and deleting old websites (dead-links) from the search engine index 210. In an example embodiment, an HTTP "HEAD" request may be used to provide a status of a webpage.

Figure 5:
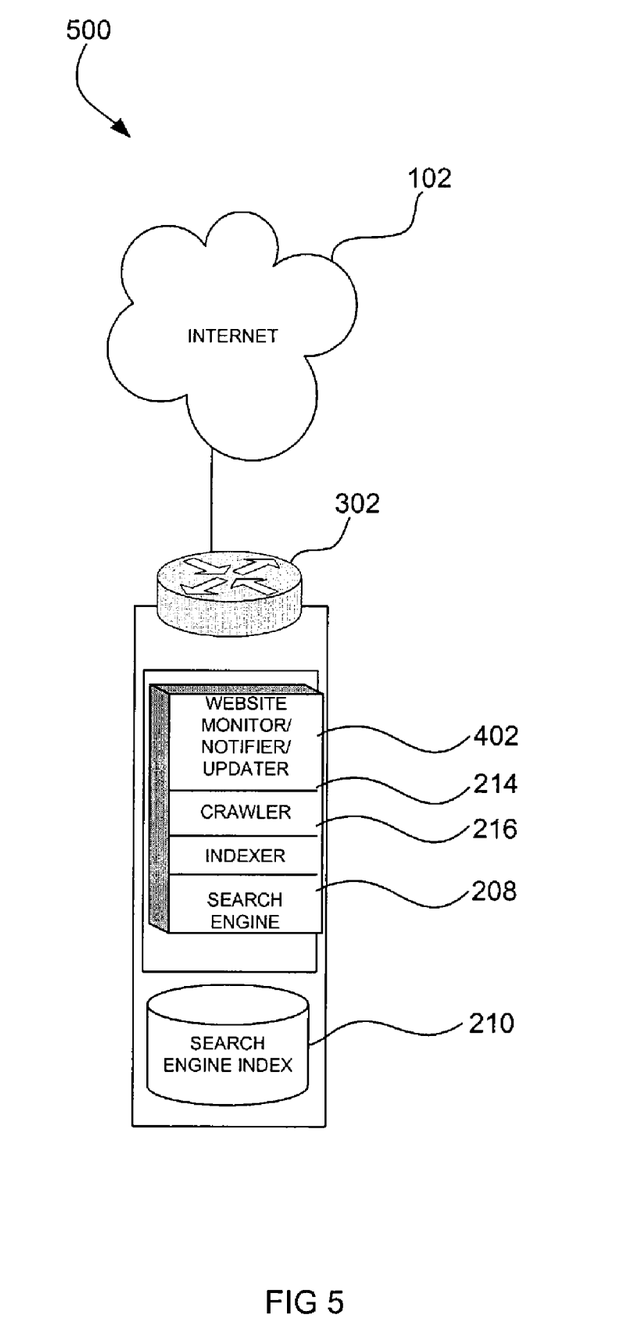
FIG. 5 shows a schematic representation of a fourth example embodiment of a system for updating a search engine index using website monitor/notifier/updater.

Referring now to FIG. 5, a system 500, in accordance with a fourth example embodiment, is shown. This example embodiment is similar to that of FIG. 4, however many of the tasks have been consolidated in one network device, particularly the router 302. Alternatively, all the components may also be separately housed in a web appliance, sitting behind the router 302 (not shown). The router 302 includes a plurality of modules, namely the website monitor/notifier/updater module 402, a crawler 214, an indexer 216, and optionally a search engine 208 and a search engine index 210. The website monitor/notifier/updater module will update the search engine index 210 directly if there are new sites/URLs found and/or dead-links found.

Although this example is described with reference to one particular router 302, it is to be appreciated that the router is representative of any network device forming part of the Internet backbone. In fact, with reference to FIGS. 2 and 3, the TrafficRank server 204 may receive communications from a plurality of different network devices having TrafficRank generators 202. With reference to FIGS. 4 and 5, the search engine index 210 may be updated by a plurality of website monitor/notifier/updater modules 402 on respective network devices.

It is to be understood that in another embodiment (not shown), the TrafficRank index 205 and the search engine index 210 may be consolidated into one index.

Figure 6:
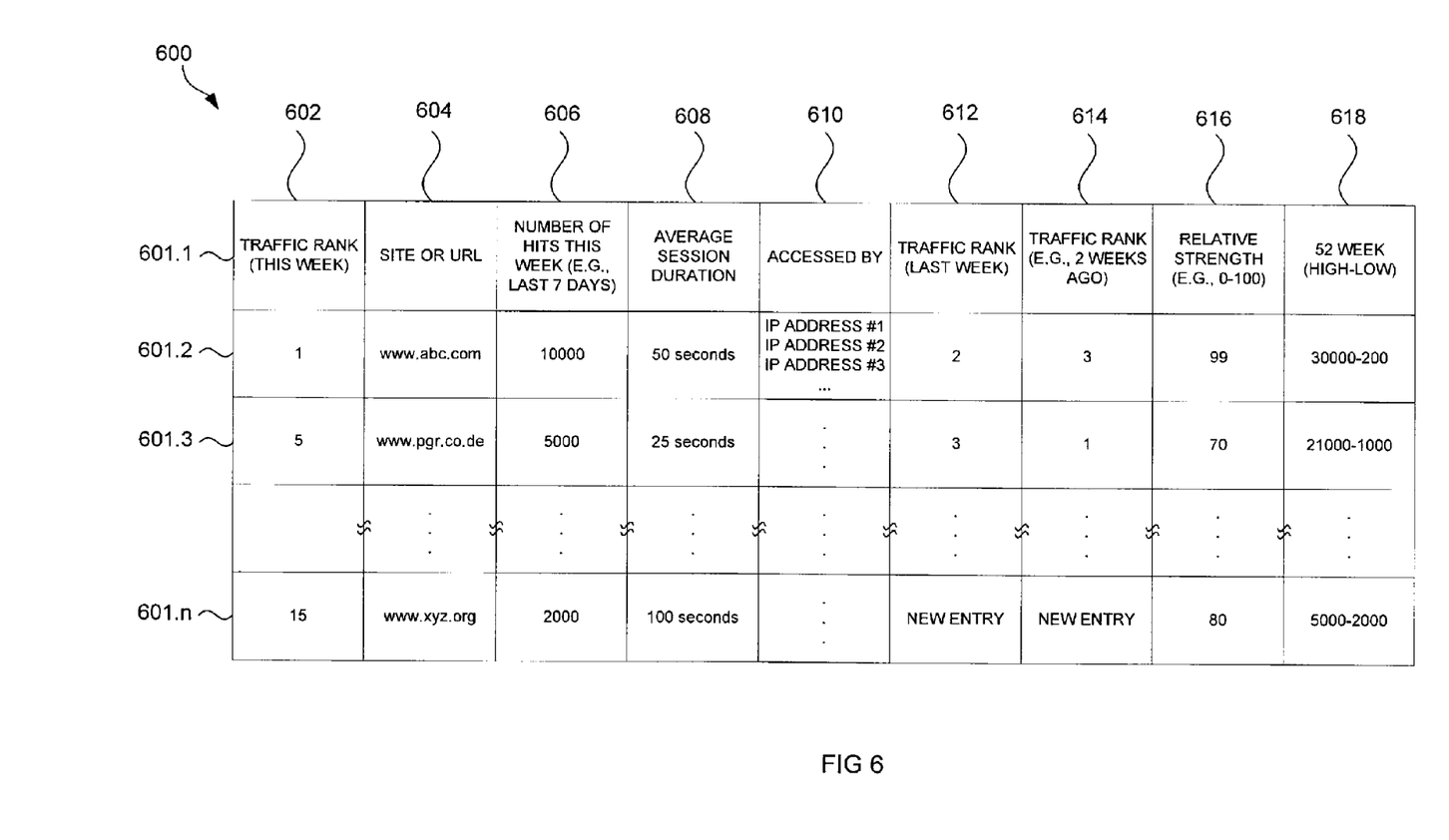
FIG. 6 shows an example embodiment of a TrafficRank index.

Referring now to FIG. 6, reference numeral 600 indicates a simplified example, in table form, of the structure of the TrafficRank index 205. The example table 600 is shown to include a plurality of rows 601.1-601.$n$. Each row 601.1-601.$n$ represents modified traffic data or statistics relating to a particular website. The example table 600 is shown, by way of example, to include 9 columns. Column 602 provides a TrafficRank rank during a particular week for each of a plurality of websites identified in column 604. Thus, fields in column 604 may include a web address or URL of an associated website. Again, TrafficRank can be configured to rank individual URLs or a website/domain. Fields in a column 606 indicate a number of hits received by the associated website during the course of the particular week (number of times the website has been accessed during the week), fields in a column 608 indicate an average session duration of each access session, fields in a column 610 indicate source IP addresses from which the website was accessed, and fields in a column 612 indicate a ranking of the website the previous week, fields in a column 614 may indicate the ranking of the website 2 weeks ago. Column 616 may indicate the relative strength of the ranking (which may provide an indication as to how fast a particular web site is moving up in ranking and thus its "momentum")). Another example column 618 indicates a 52 week high and a low number of website accesses. The example table 600 may be used by a search engine to rank search engine results as herein described. Further, in an example embodiment, columns 602 and 604 may be required whereas columns 606-618 may be optional.

More example embodiments are now described with reference to the method described in FIGS. 7 to 8.

Figure 7A:
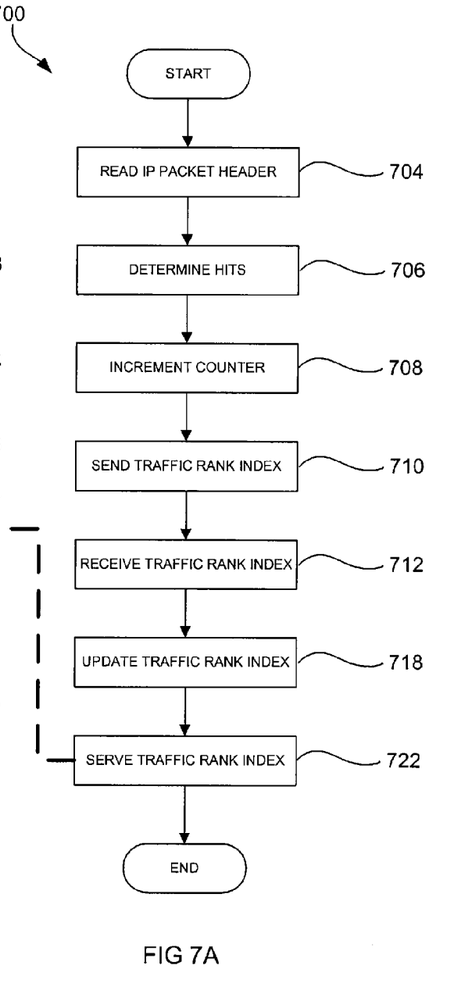
FIG. 7A shows a flow-diagram of an example method for generating TrafficRank index.

FIG. 7A shows a flow-diagram of an example method 700 for generating TrafficRank index.

The method 700 may be deployed in a network device (e.g., the router 112) of the system 200 of FIG. 2 and, accordingly, is described by way of example with reference thereto. It will however be understood that it may also apply to a network device (e.g., the router 302) of the system 300 of FIG. 3.

In the method 700, the TrafficRank generator 202 of the router 112 may read IP packets, specifically the packet headers, which it routes, to determine or monitor Internet traffic. Particularly, the TrafficRank generator 202 (for example under the direction of the software 924 shown in FIG. 9), reads, at block 704, a destination IP address in the IP packet header to determine, at block 706, how many times a particular website is accessed, in other words, to determine how many hits a website receives. In response to the determination, a counter may be increased as shown at block 708. The router 112 therefore monitors Internet traffic at a network level. In this example, a user is shown access a website on computer server 106.1 from computer terminal 103.1. For example, the destination IP address of IP packets from computer terminal 103.1 are therefore the IP address of computer server 106.1, which are converted to and from a URL by a Domain Name Server (DNS).

However, it is to be appreciated that during a single session, a multitude of IP packets are typically communicated between a client computer and a server computer, and the TrafficRank generator 202 therefore may include pre-defined determination criteria to eliminate duplication (e.g., resulting from multiple packet communications in a single session)

thereby providing a more accurate determination of the number of hits a website receives. For example, multiple IP packets sent to a destination IP address (computer server 106.1) from a single source IP address (computer terminal 103.1) within pre-determined time period (for example one hour) are counted as only one hit. Instead, a single session can be counted as one hit, for example by determining the number of IP packets required to initiate a session or connection, and counting each initialisation packet (or the like) as only one hit. Because the source IP address is monitored, users may be prevented from increasing the amount of hits a website receives (thereby increasing its rank) by repeatedly accessing the website. Also, Denial of Services (DoS) attacks can be detected. The TrafficRank generator 202 further monitors file formats or types (for example web pages—.html, voice/audio—.mp3/.wav, video—.mpg/.wmv), to determine the number of hits for files of different formats. The TrafficRank generator 202 may therefore determine traffic or usage statistics, which includes number of hits a website receives, file formats accessed, a source of the hit, etc.

The router 112 may then communicate or send monitored traffic data, at block 710, to the computer server 203 hosting the TrafficRank server 204. In another embodiment (not shown), the monitored traffic data is temporarily stored on the router 112, and periodically accessed, for example as a series of batch updates, by the TrafficRank server 204. The TrafficRank server 204 may receive, at block 712, monitored traffic data from a plurality of routers, including routers 104, 108, 112 and intermediate routers forming part of the Internet backbone, thereby generating TrafficRank for a plurality of computer servers and websites.

The TrafficRank server 204 then updates, at block 718, its ranking information and TrafficRank index 205. For example, each time a website has received a hit, the total number of hits received by that website is incremented by one (optionally taking into account the determination criteria to avoid duplication).

Figure 7B:
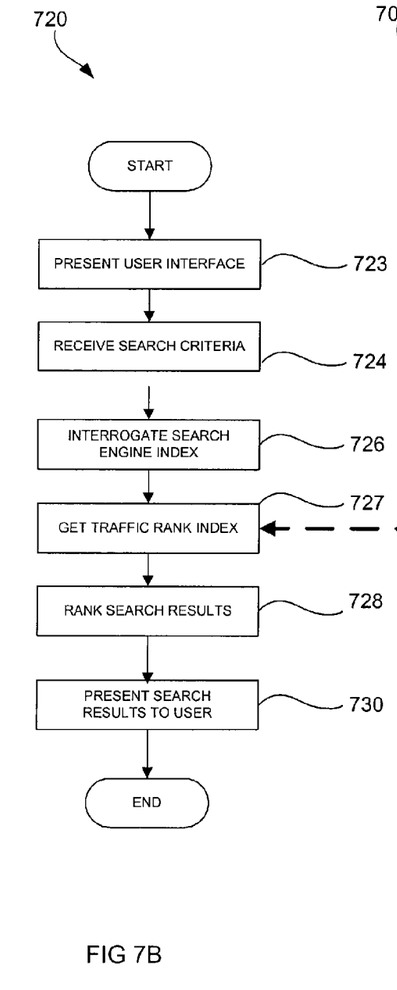
FIG. 7B shows a flow-diagram of an example method for ranking search results based on TrafficRank.

FIG. 7B shows a flow-diagram of an example method 720 for ranking search results using TrafficRank. An Internet user may accesses the search engine 208, for example from computer terminal 103.1, and the search engine 208 presents, at block 723, a user interface via which the user enters search criteria. The search criteria typically include keywords, but may also include file formats, domains, and the like. The search engine 208 receives, at block 724, the search criteria, and interrogates, at block 726, the search engine index 210, to determine if any websites or documents match the search criteria. Thereafter, as shown at block 727, the TrafficRank data or monitored traffic data is obtained. The search results are then ranked at block 728 by the TrafficRank server 204 based on the TrafficRank index (monitored network traffic). Other ranking criteria may include, for example, number of occurrences of the search criteria, etc., in conventional fashion. However, the rank of the search results is based, at least partially, on the network traffic to websites. A websites with more hits may receive a higher ranking than a website with fewer hits. The search results are then ranked to indicate the popularity of the website or document based on current Internet user trends. The search results are presented, at block 730, to the user. The search results may include traffic data relating to the matched documents, for example, the search results may indicate how many hits the documents have received in the last week. Further, because the source of the IP packets may also be tracked, the search results may indicate, in response to a user selecting a particular web page (e.g., following the link to that web page) those web pages which other users have accessed in addition to that particular web page. In other words, the search engine 208 may provide a message like "Users who viewed this web page also viewed the following web pages . . . "

Figure 8:
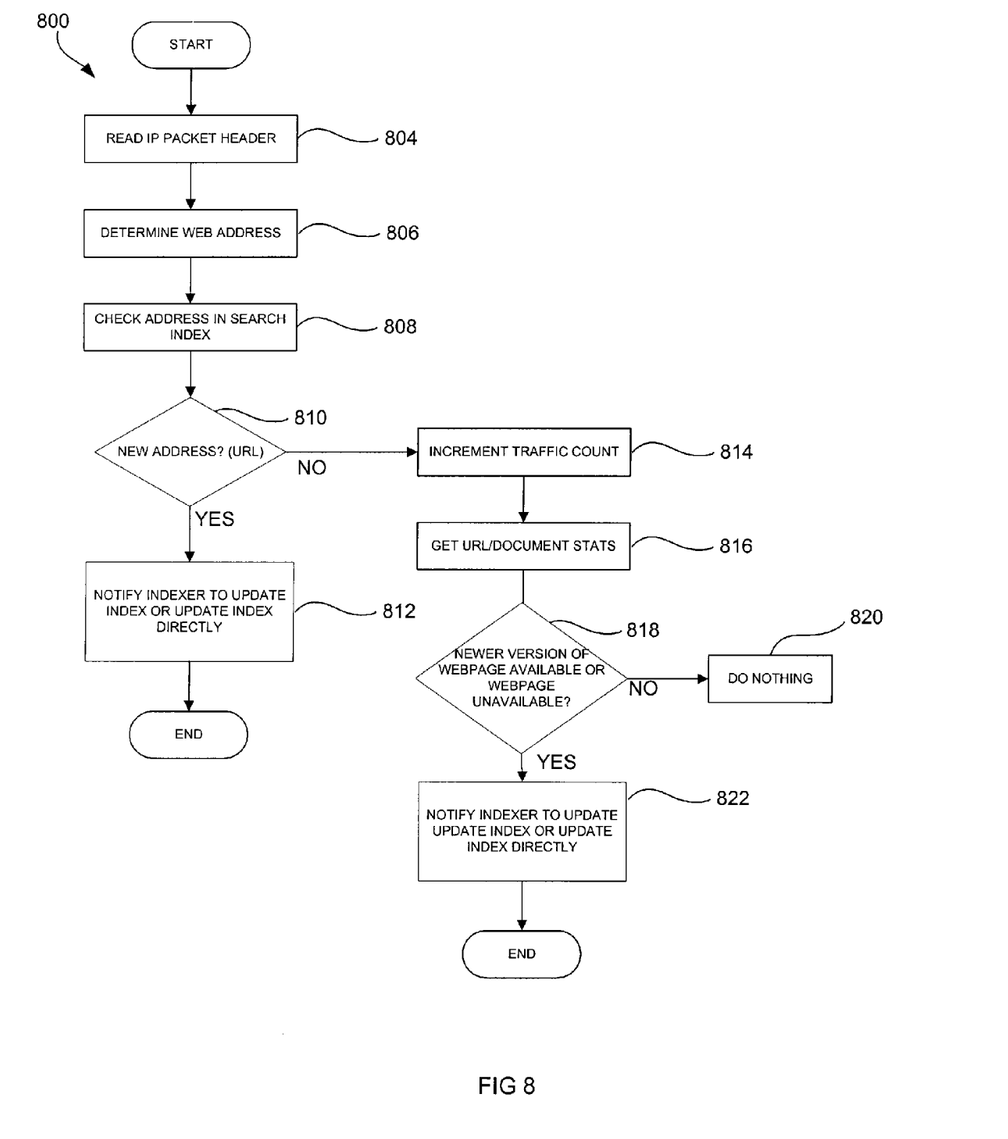
FIG. 8 shows a flow-diagram of an example method for updating search engine index using network website monitor/notifier/updater.

FIG. 8 shows a method 800 for updating a search engine index in a network. The method 800 may be deployed in the system 400 of FIG. 4 and, accordingly, is described by way of example with reference thereto. The method 800 may also be deployed in the system 500 of FIG. 5.

In the method 800, at block 804 a network device such as the router 112, under the direction of the website monitor/notifier/updater module 402, reads an IP packet header at block 804 and determines at block 806 web address of websites being accessed by Internet users. The website monitor/notifier/updater module 402 may therefore monitor Internet traffic. Thereafter, as shown at block 808 a determination is made if the web address is in the search index. As shown it decision block 810, if the web address is a new web address (URL) then the method 800 proceeds to block 812 where the indexer is notified to update the index or, the index is updated directly. Returning to decision block 810, if the web address is not a new address, then the method 800 proceeds to block 814 where a traffic count is incremented. Thereafter, as shown at block 816, URL or document statistics may be obtained. If there is a newer version of the web page than the one in the search engine index 210, then as shown at decision block 818, the indexer 216 is once again notified to update the index or, the index is directly updated and if the web page is no longer available (a dead-link), the web page is deleted from the search engine index 210; otherwise, then in an example embodiment the method 800 does nothing as shown at block 820. Since this is happening in real-time, the search engine index 210 may therefore be kept more up-to-date than other indexes merely populated by a crawler.

In another embodiment the list of websites may be sent periodically to the indexer 216 by website monitor/notifier/updater 402, for example in batches at pre-determined send intervals, or the indexer 216 could be configured to retrieve batches from the router 112. The crawler 214 then uses the list, updated Internet addresses as seed URLs to crawl the Internet 102.

Figure 9:
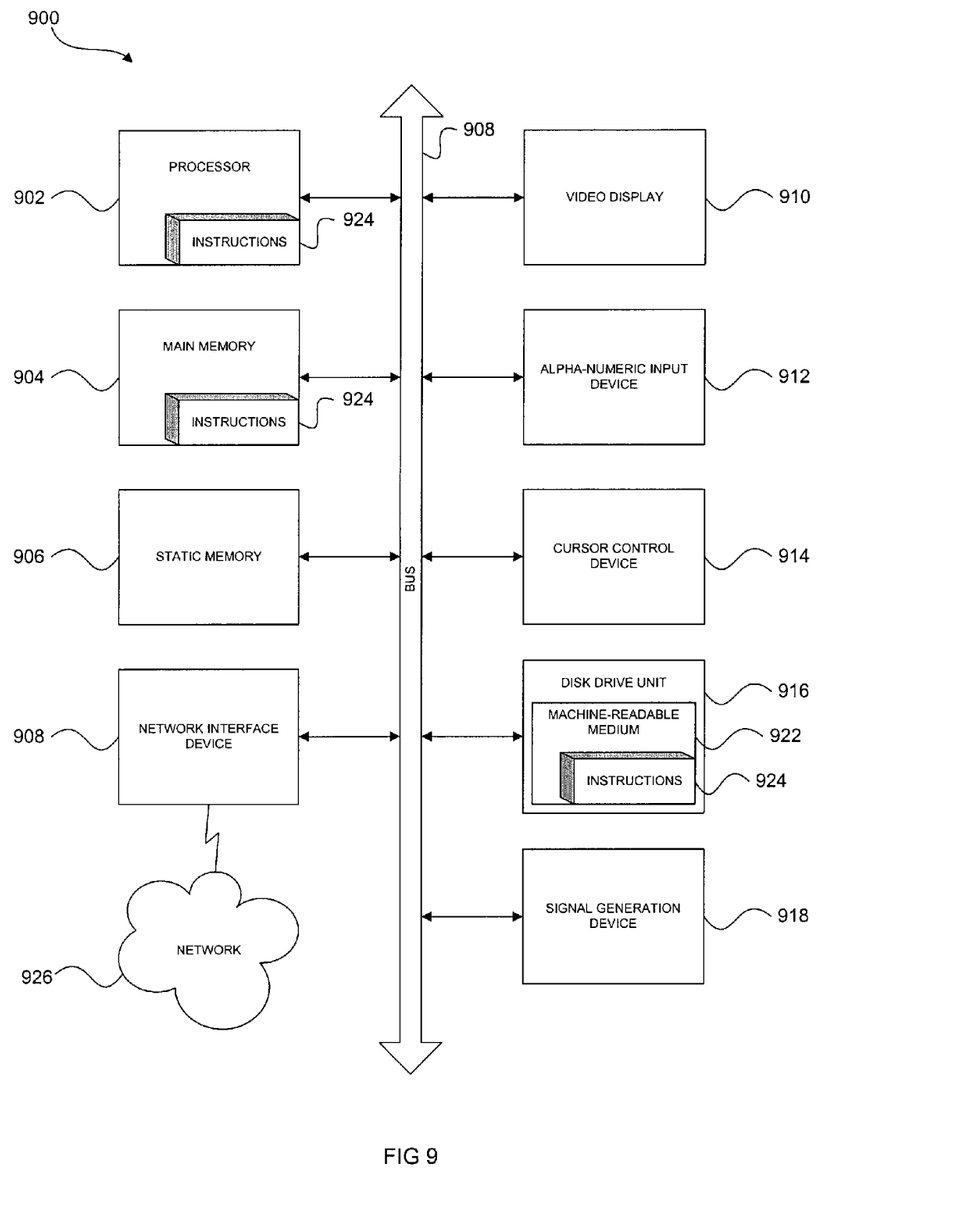
FIG. 9 shows a schematic representation of a machine in the example form of a computer system within which a set of instructions, for causing the machine to perform any one or more of the methodologies discussed herein, may be executed.

FIG. 9 shows a diagrammatic representation of a machine in the example form of a computer system 900 within which a set of instructions, for causing the machine to perform any one or more of the methodologies discussed herein, may be executed. In alternative embodiments, the machine operates as a standalone device or may be connected (for example, networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (for example, a central processing unit (CPU), a graphics processing unit (GPU) or both), a main memory 904 and a static memory 906, which communicate with each other via a bus 908. The computer system 900 may further include a video display unit 910 (for example, a liquid crystal display (LCD) or a cathode ray tube (CRT)). The computer system 900 also includes an alphanumeric input device 912 (for example, a keyboard), a user interface (UI) navigation device 914 (for example, a mouse), a disk drive unit 916, a signal generation device 918 (for example, a speaker) and a network interface device 260.

The disk drive unit 916 includes a machine-readable medium 922 on which is stored one or more sets of instructions and data structures (for example, software 924) embodying or utilized by any one or more of the methodologies or functions described herein. The software 924 may also reside, completely or at least partially, within the main memory 904 and/or within the processor 902 during execution thereof by the computer system 900, the main memory 904 and the processor 902 also constituting machine-readable media.

The software 924 may further be transmitted or received over a network 926 via the network interface device 920 utilizing any one of a number of well-known transfer protocols (for example, HTTP).

While the machine-readable medium 922 is shown in an example embodiment to be a single medium, the term "machine-readable medium" should be taken to include a single medium or multiple media (for example, a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, and optical and magnetic media.

Conveniently, a system is configured to implement the method of ranking search results and the method of maintaining a search engine index, thereby providing search results which are ranked based on current Internet trends from an up-to-date index.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method of generating an index for a search engine, the method comprising:
    receiving monitored network traffic information from a plurality of network devices including a first network device and a second network traffic device, the plurality of network devices respectively receiving and forwarding at least a part of the monitored network traffic information, the monitored network traffic information including at least one Uniform Resource Locator (URL) and traffic statistics, the traffic statistics including at least one traffic ranking respectively assigned to the at least one URL;
    filtering to identify and remove at least one duplicate access to the at least one URL from the monitored network traffic information to generate filtered monitored network traffic information, the filtering being based on a single source/destination in a single session, the filtering comprising:
        identifying a first access to a first URL by identifying a first monitored network traffic information that is received from the first network device as indicating at least one packet as originated from a first network traffic source and destined for the first URL,
        identifying a second access to the first URL by identifying a second monitored network traffic information that is received from the second network device indicating at least one packet as originated from the first network traffic source and destined for the first URL, and
        removing the second access to the first URL responsive to identifying the second access to the first URL as being performed within a predetermined time period after the first access to the first URL;
    ranking the filtered monitored network traffic information according to the traffic statistics; and
    updating a search engine index based on the filtered monitored network traffic information as ranked according to the traffic statistics.

2. The method as claimed in claim 1, wherein the monitored network traffic information includes Uniform Resource Locators (URLs) information, the URL information associated with the websites.

3. The method as claimed in claim 2, further comprising:
    keeping track of a number of times a website is accessed, wherein a first web site is ranked higher than a second website when a number of times the first website is accessed is higher than a number of times the second website is accessed.

4. The method as claimed in claim 2, wherein the monitored network traffic information is presented further based on algorithmic weightings.

5. The method as in claim 1, wherein the filtering at least one duplicate access to the at least one URL further comprises packet communications in a single session.

6. The method as in claim 1, wherein the receiving the monitored network traffic information from a plurality of network devices includes receiving network traffic information from a first network device and receiving monitored network traffic information from a second network device.

7. A computer-implemented method of generating an index for a network search engine, the method comprising:
    receiving monitored network traffic information from a plurality of network devices including a first network device and a second network device, the plurality of network devices respectively receiving and forwarding at least a part of the monitored network traffic information, the monitored network traffic information including at least one Uniform Resource Locator (URL) and traffic statistics;
    filtering to identify and remove at least one duplicate access to the at least one URL from the monitored network traffic information to generate filtered monitored network traffic information, the filtering being based on a single source/destination in a single session, the filtering comprising:
        identifying a first access to a first URL by identifying a first monitored network traffic information that is received from the first network device as indicating at least one packet as originated from a first network traffic source and destined for the first URL,
        identifying a second access to the first URL by identifying a second monitored network traffic information that is received from the second network device indicating at least one packet as originated from the first network traffic source and destined for the first URL,
        removing the second access to the first URL responsive to identifying the second access to the first URL as being performed within a predetermined time period after the first access to the first URL;
ranking the filtered monitored network traffic information according to the traffic statistics; and
updating a search engine index based on the filtered monitored network traffic information as ranked according to the traffic statistics.

8. The method as claimed in claim 7, wherein the traffic statistics include a number of times a website associated with the URL has been accessed, wherein search results associated with the search engine index includes information about multiple websites, and wherein the search results are ranked at least according to the number of times each of the multiple websites is accessed.

9. The method as claimed in claim 8, wherein the search results are further ranked according to algorithmic weightings.

10. The method as claimed in claim 7, wherein the search engine index is updated when the URL is associated with more updated content.

11. A computer-implemented method of providing search results, the method comprising:
responsive to a search request,
generating search results using information from a search engine index, the search results including information associated with a plurality of websites;
ranking the plurality of websites based on traffic statistics received from a plurality of network devices including a first network device and a second network device, the plurality of network devices respectively receiving and forwarding at least a part of monitored network traffic information that includes the traffic statistics, the traffic statistics including accesses to the plurality of websites that have been filtered to identify and remove at least one duplicate access based on a single source/destination in a single session, the filter comprises:
an identification of a first access to a first URL by an identification of a first traffic statistic that is received from the first network device that indicates at least one packet as originated from a first network traffic source and destined for the first URL,
an identification of a second access to the first URL by an identification of a second traffic statistic that is received from the second network device that indicates at least one packet as originated from the first network traffic source and destined for the first URL,
a removal of the second access to the first URL responsive to an identification of the second access to the first URL as being performed within a predetermined time period after the first access to the first UR, and
presenting the search results according to said ranking.

12. The method as claimed in claim 11, wherein each of the plurality of websites is associated with an access frequency, and wherein a website accessed more frequently is ranked higher than a website accessed less frequently.

13. A non-transitory computer readable medium embodying instructions which, when executed by one or more processors, cause the one or more processors to perform operations comprising:
receiving monitored network traffic data for each of a plurality of websites, the monitored network traffic data being monitored by a plurality of network devices including a first network device and a second network device that respectively receive and forward at least part of the monitored network traffic data;
storing the monitored network traffic data for each of the plurality of websites; filtering to identify and remove at least one duplicate access to the plurality of websites from the monitored network traffic data, the filtering being based on a single source/destination in a single session and comprising:
identifying a first access to a first URL by identifying a first monitored network traffic data that is received from the first network device as indicating at least one packet as originated from a first network traffic source and destined for the first URL,
identifying a second access to the first URL by identifying a second monitored network traffic data that is received from the second network device indicating at least one packet as originated from the first network traffic source and destined for the first URL, and
removing the second access to the first URL responsive to identifying the second access to the first URL as being performed within a predetermined time period after the first access to the first URL; and
ranking the plurality of websites in search results at least according to their respective access frequency as determined from the filtered monitored network traffic data.

14. A system for generating an index for a network search engine, the system comprising:
a processor for executing:
means for receiving monitored network traffic data monitored by a plurality of network devices including a first network device and a second network device, the plurality of network devices respectively receive and forward at least a part of the monitored network traffic data;
means for determining data to be added to a search engine index using the monitored network traffic data;
means for keeping track of access frequency of websites associated with Uniform Resource Locators (URLS) included in the monitored network traffic data;
means for filtering to identify and remove at least one duplicate access to at least one of the websites from the monitored network traffic data to generate filtered monitored network traffic data, the filtering being based on a single source/destination in a single session and comprising:
identifying a first access to a first URL, by identifying a first monitored network traffic data that is received from the first network device that indicates at least one packet as originated from a first network traffic source and destined for the first URL,
identifying a second access to the first URL, by identifying a second monitored network traffic data that is received from the second network device that indicates at least one packet as originated from the first network traffic source and destined for the first URL, and
removing the second access to the first URL responsive to an identification of the second access to the first URL as being performed within a predetermined time period after the first access to the first URL;
means for including the filtered monitored network traffic data in the search engine index in search results responsive to a search request; and
means for ranking websites included in the search results at least according to the access frequency of the websites.

15. The system of claim 14, wherein said means for determining the data to be added to the search engine index includes means for determining whether the data is already existing in the search engine index.

16. The system of claim 14, wherein said means for determining the data to be added to the search engine index includes means for determining whether an older version of the data is already existing in the search engine index.

17. The system of claim 14, further including means for ranking the websites included in the search results according to algorithmic weightings in addition said access frequency.

18. A network device comprising:
  a processor;
  a search engine index coupled to the processor and configured to store information related to a plurality of websites;
  a monitoring module coupled to the search engine index and configured to monitor network data received and forwarded by a network device and network data received and forwarded by a plurality of other network devices including a first network device and a second network device, the monitoring module to filter the network data to identify and remove at least one duplicate access to a first website that is included in the plurality of websites based on a single source/destination in a single session, the filter comprises the monitoring module to:
    identify a first access to a first URL by an identification of a first network data that is received from the first network device that indicates at least one packet as originated from a first network traffic source and destined for the first URL,
    identify a second access to the first URL by an identification of a second network data that is received from the second network device that indicates at least one packet as originated from a first network traffic source and destined for the first URL, and
    remove the second access to the first URL responsive to an identification of the second access to the first URL as being performed within a predetermined time period after the first access to the first URL,
    the monitoring module to determine whether the network data includes information to be added to the search engine index;
  a search module coupled to the search engine index to perform search against the search engine index responsive to a search request; and
  a ranking module to rank search results generated by the search module according to a filtered number of accesses of each of the websites included in the search results.

19. The device of claim 18, wherein the number of access of a website is incremented when the network data includes information that indicates a Uniform Resource Locator (URL) associated with the website.

20. A search server system to provide search results to at least one computer connected to the server via a network, the system comprising:
  a processor;
  a search engine index coupled to the processor and configured to store information used to generate search results, the search results includes information associated with a plurality of websites;
  a traffic rank index coupled to the search engine index and configured to store traffic rank information associated with at least some of the plurality of websites, the traffic rank information generated from network traffic information received and forwarded by a plurality of network devices including a first network device and a second network device, the search results are presented at least according to the traffic rank information, and the traffic rank information associated with a website is determined based on number of times the website is accessed and is filtered to identify and remove at least one duplicate access to the website based on a single source/destination in a single session, the filter comprises:
    an identification of a first access to a first URL by an identification of a first network traffic information that is received from the first network device that indicates at least one packet as originated from a first network traffic source and destined for the first URL;
    an identification of a second access to the first URL by an identification of a second network traffic information that is received from the second network device that indicates at least one packet as originated from a first network traffic source and destined for the first URL and
    a removal of the second access to the first URL responsive to an identification of the second access to the first URL as being performed within a predetermined time period after the first access to the first URL.

\* \* \* \* \*